United States Patent [19]

Valentine

[11] Patent Number: 5,236,148
[45] Date of Patent: Aug. 17, 1993

[54] ANTI-RATTLE DEVICE FOR THUMB BUTTON ON FISHING REEL

[75] Inventor: David E. Valentine, Tulsa, Okla.
[73] Assignee: Zebco Corporation, Tulsa, Okla.
[21] Appl. No.: 740,882
[22] Filed: Aug. 6, 1991
[51] Int. Cl.$^5$ .................. A01K 89/00; F16C 33/02
[52] U.S. Cl. .................. 242/239; 242/321; 384/125; 16/DIG. 013
[58] Field of Search .......... 242/238, 239, 240, 311, 242/313, 321; 16/227, 267, 257, 337, 342, DIG. 6, DIG. 13; 403/96, 116; 384/125

[56] References Cited

U.S. PATENT DOCUMENTS

| | | | |
|---|---|---|---|
| 4,109,821 | 8/1978 | Lutz | 16/DIG. 13 |
| 4,180,217 | 12/1979 | Harre et al. | 242/311 X |
| 4,331,303 | 5/1982 | Moss | 242/311 |
| 4,415,882 | 11/1983 | Neufeld | 242/239 |
| 4,456,194 | 6/1984 | Noda | 242/311 X |
| 4,760,973 | 8/1988 | Hlava | 242/311 |
| 4,942,271 | 7/1990 | Corsi et al. | 16/267 X |

FOREIGN PATENT DOCUMENTS 1306254  9/1962  France .................. 16/342

*Primary Examiner*—Daniel P. Stodola
*Assistant Examiner*—Michael R. Mansen
*Attorney, Agent, or Firm*—Wood, Phillips, VanSanten, Hoffman & Ertel

[57] ABSTRACT

A connection between a thumb button and a housing on a fishing reel. A socket is provided on the housing and has a curved seat. A pin is provided on the thumb button for reception in the socket and has a curved surface acting against the curved socket seat to guide pivoting of the pin in the socket and thereby rotation of the thumb button about a first axis. A projection is provided extending radially outwardly from the curved pin surface with respect to the first axis to take up clearance between the curved pin surface and the curved socket seat.

20 Claims, 1 Drawing Sheet

ANTI-RATTLE DEVICE FOR THUMB BUTTON ON FISHING REEL

BACKGROUND OF THE INVENTION

1. Field of the Invention

This invention relates to fishing reels of the type having a translatable center shaft that is shifted through a pivotable thumb button and, more particularly, to a connection between the thumb button and a supporting housing which facilitates smooth pivoting of the thumb button relative to the housing and avoids rattling therebetween.

2. Background Art

In conventional spin cast fishing reels, a pivotable thumb button is employed to place the reel selectively in its casting mode. The thumb button is typically mounted in an opening at the rear of the reel housing and, once depressed, shifts a center shaft forwardly, which in turn moves a spinner head at the distal end of the center shaft and simultaneously retracts a pick-up pin. The forwardly shifting spinner head snubs the line against an inside surface of the housing to allow the rod to be cocked without line payout. The thumb button is released at the same time the rod is thrust forwardly so that the line freely uncoils from a spool on which it is stored.

To facilitate assembly of the thumb button, it is common to use a snap fit pin and socket connection. Typically, a pin projects in cantilever fashion oppositely from the sides of the thumb button. The housing has receptive sockets for the pins. Each socket has a curved seat defined by bendable legs which are spaced slightly from each other to define an entryway having a diameter less than the diameter of the pins. To seat the pins, the pins are forced against the free ends of the legs which spread sufficiently to allow entry of the pins. Once the pins are fully seated, the memory in the legs draws the legs back towards each other to maintain the pins in the sockets.

Designers of thumb buttons deal with two competing objectives. First, it is desirable to have a thumb button that is readily pivotable on the housing. Secondly, it is desirable that the thumb button be maintained firmly in its undepressed state so that it does not tend to rattle on the housing. While closely fitting the pin and socket obviates the latter problem, it aggravates the former problem. One proposed solution to this has been the provision of a separate spring, which biases the thumb button to an undepressed state. Exemplary spring structures are shown in U.S. Pat. No. 4,415,129, to Neufeld. While the Neufeld structure eliminates rattling, it requires the assembly of an additional part, which is undesirable.

SUMMARY OF THE INVENTION

The present invention is specifically directed to overcoming the above enumerated problems in a novel and simple manner.

More particularly, the invention is directed to a connection between a thumb button and a housing on a fishing reel. A socket is provided on the housing and has a curved seat. A pin is provided on the thumb button for reception in the socket and has a curved surface acting against the curved socket seat to guide pivoting of the pin in the socket and thereby rotation of the thumb button about a first axis. A projection is provided extending radially outwardly from the curved pin surface with respect to the first axis to take up clearance between the curved pin surface and the curved socket seat.

Preferably, the projection is a flexible fin which sweeps against the curved socket seat as the thumb button is rotated during operation. The fin can be configured so that there is unobstructed movement of the pin in the slot throughout the range of pivoting of the thumb button.

In one form, the fin is made from plastic. The fin can be integrally molded with the thumb button pin from plastic.

In a preferred form, the fin extends over substantially the entire axial extent of the pin.

The fin may take a number of different cross sectional shapes viewed at right angles to the pivot axis for the thumb button. In one form, the cross-sectional configuration is rectangular, with the fin projecting in cantilever fashion from the pin.

In one form of the invention, the thumb button has laterally spaced, oppositely projecting pins, each with a projection as described above.

DETAILED DESCRIPTION OF THE DRAWINGS

Figure 1:
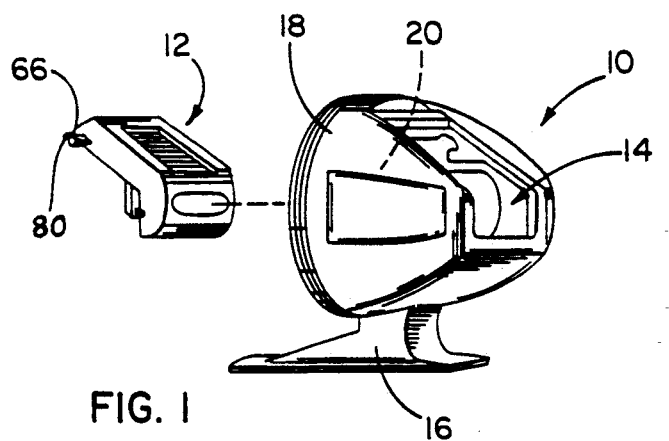
FIG. 1 is an exploded perspective view of part of a reel housing with a thumb button for connection thereto according to the present invention.

In FIG. 1, a rear housing part for a spin cast fishing reel is shown at 10, with a thumb button at 12, according to the present invention, for operatively engaging within a rear opening 14 in the housing part 10. The rear housing part 10 has a mounting foot 16 for connection to a fishing rod (not shown) and a cup-shaped, forwardly opening body 18 defining a receptacle 20 for a reel operating mechanism, part of which is shown at 22 in FIG. 4.

The reel operating mechanism 22 for an exemplary spin cast fishing reel is described fully in U.S. Pat. No. 4,415,129, to Neufeld, which patent is incorporated herein by reference. A brief description of the reel operation follows solely for purposes of setting the environment for the invention.

Figure 4:
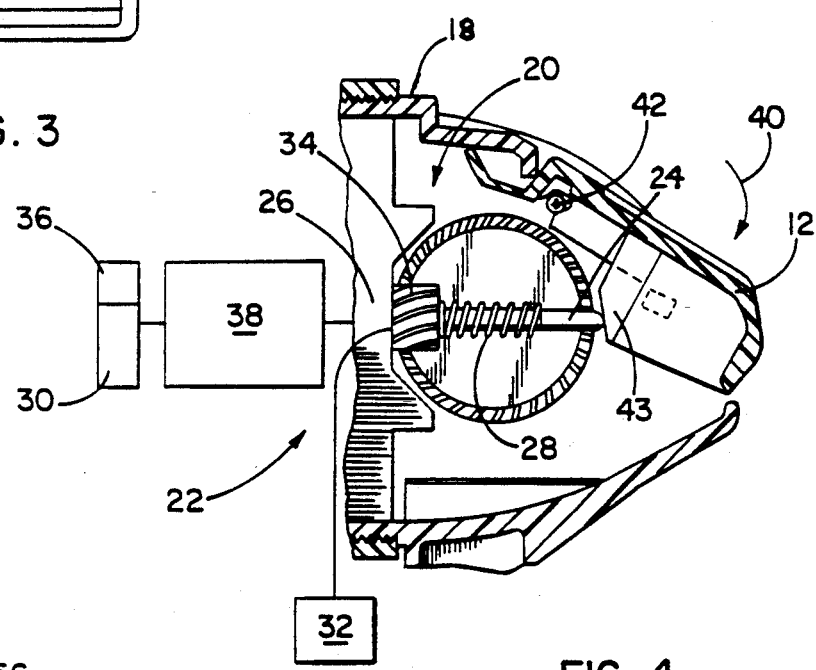
FIG. 4 is a fragmentary, side sectional view of a prior art thumb button operatively connected to a reel housing.

More specifically, with reference to FIG. 4, the reel operating mechanism consists of a center shaft 24, which is journalled for rotation in a reel body 26 and shiftable in a fore and aft direction. A coil spring 28 normally biases the center shaft 24 to its rearward most position, shown in FIG. 4. At the front, distal end of the center shaft 24, a spinner head 30 is mounted. The center shaft 24 and spinner head 30 are rotated by a means 32, which includes a crank handle (not shown) that is keyed to a pinion gear 34. Rotation of the center shaft 24 and spinner head 30 causes a pick-up pin 36 on the spinner head 30 to wrap line onto a line-carrying spool 38.

Depression of the thumb button 12 effects rotation thereof in a clockwise direction, indicated by arrow 40 about a laterally extending pivot axis 42, which causes a depending boss 43 on the thumb button 12 to engage and shift forwardly the center shaft 24 and attached spinner head 40. This effects a change of the fishing reel from the retrieve mode of FIG. 4 to the casting mode, wherein the pick-up pin 36 is retracted and the spinner head 30 is borne against the inside surface of a front housing (not shown). The cast is thus effected by cocking the rod with the thumb button 12 depressed and simultaneously thrusting the rod and releasing the thumb button 12 to allow the line to pay out freely from the spool 38.

The present invention is directed to the connection of the thumb button 12 to the reel housing 10. Before doing this, the prior art connecting structure shown in FIG. 4 will be described in detail, with reference to FIG. 5.

Figure 5:
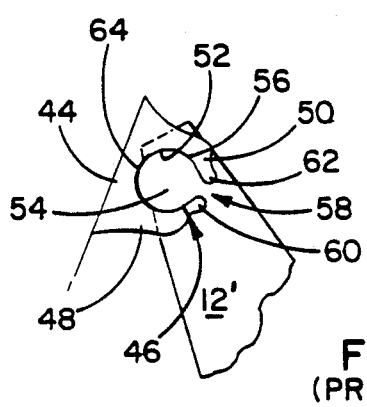
FIG. 5 is an enlarged, fragmentary, side elevation view of the pin and slot connection on the reel of FIG. 4.

In FIG. 5, the housing 44 has an integral socket 46 defined by two spaced, bendable legs 48, 50 which cooperatively define a curved seat 52 for a pin 54 on the thumb button 12'. The pin 54 has a curved outer surface 56 which is guided in rotation against the seat 52.

Preferably, there is a pin 54 projecting laterally oppositely in cantilever fashion from each side of the thumb button 12'. The pins 54 are forcibly directed through a restricted entryway 58 defined between adjacent free ends 60, 62 on the legs 48, 50, respectively. Once the pins 54 are fully seated, the memory in the legs 48, 50 restricts the entryway 58 to captively maintain the pins 54 in their operative positions.

If the pins 54 are exactly conforming to the seats 52, there is a substantial amount of friction generated which inhibits pivoting of the thumb button 12', which is undesirable. Normally, a slight clearance space 64 is defined between the outer pin surface 56 and the seat 52 to prevent binding. It is thus possible for the pins 54 to shift slightly back and forth into engagement with the seat 52, which produces an undesirable rattling noise.

Figure 2:
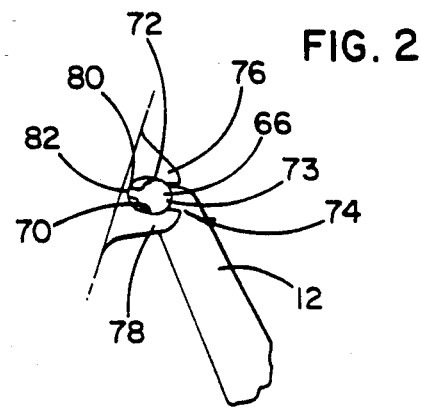
FIG. 2 is an enlarged, fragmentary, side elevation view of a pin and slot connection, according to the present invention, between the thumb button and reel housing.
Figure 3:
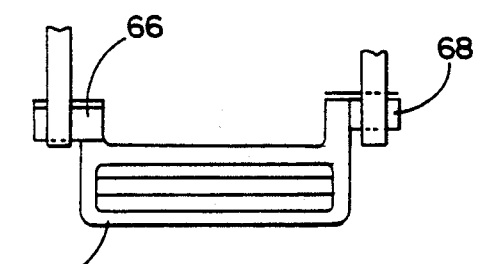
FIG. 3 is a plan view of the operatively connected thumb button and housing of FIG. 2.

According to the invention, and as seen clearly in FIGS. 1, 2 and 3, laterally projecting pins 66, 68 are provided on the thumb button 12 to project laterally oppositely therefrom. Each pin 66, 68 nests in a curved seat 70 having an effective diameter that is slightly larger than the diameter of the generally cylindrical, outer surface 72 of each pin body 73. Each pin 66, 68 is directed through a restricted entryway 74 defined between spaced legs 76, 78. The entryway 74 has a width that is less than the diameter of the pin body 73.

According to the invention, a projection/flexible fin 80 is provided radially outwardly from at least one, and preferably both, of the pins 66, 68. The projection/flexible fin 80 has a free end 82 which increases the effective diameter of the pin body 73. That is, the free end 82 of the projection/flexible fin 80 urges the diametrically opposite portion of the pin outer surface 72 against the legs 76, 78, to effectively take up clearance between the legs 76, 78 and the pins 66, 68, and thereby avoid rattling during operation.

The advantage of the projections/flexible fins 80 is that they virtually eliminate rattling without requiring exact conformity between the pin outer surface 72 and the cooperating seat 70. This obviates the need for precise relative dimensioning of the pins 66, 68 and the curved seats 70. As the pins 66, 68 pivot, the projections/flexible fins 80 can bend/deflect readily to conform to and sweep against the seat 70.

In a preferred form, the projection 80 is integrally formed with the pins 66, 68. The preferred method of manufacture is a molding process wherein the thumb button 12, pins 66, 68, and projections/flexible fins 80 are formed in one piece. In a preferred form, the projections/flexible fins 80, in cross section, are generally rectangular in shape.

The foregoing disclosure of specific embodiments is intended to be illustrative of the broad concepts comprehended by the invention.

I claim:

1. A fishing reel comprising:
   a housing;
   a line carrying spool;
   first means for selectively retrieving line onto the spool with the fishing reel in a retrieve mode and for allowing line to pay out of the spool with the fishing reel in a casting mode;
   a thumb button;
   second means for attaching the thumb button to the housing for pivoting movement between an undepressed state and a depressed state; and
   cooperating means on the first means and the thumb button for changing the reel from its retrieve mode to its cast mode as an incident of the thumb button moving from its undepressed state to its depressed state,
   said second means comprising a cooperating pin and socket one each on the housing and thumb button,
   said socket comprising a curved seat,
   said pin having a curved surface that acts against the curved socket seat to guide rotation of the thumb button about the pin and a first pivot axis,
   said curved socket seat being smoothly curved without interruption over that portion of the curved socket seat that is engaged by the projection as the thumb button moves between its undepressed and depressed states so that the thumb button will move smoothly back and forth between its undepressed and depressed states,
   said pin having a projection radially outwardly relative to the first pivot axis from the curved pin surface to engage the curved socket seat and take up clearance between the curved pin surface and the curved socket seat.

2. The fishing reel according to claim 1 wherein the projection comprises a flexible fin.

3. The fishing reel according to claim 1 wherein the projection comprises a piece of plastic.

4. The fishing reel according to claim 1 wherein the thumb button and projection are integrally formed.

5. The fishing reel according to claim 1 wherein the thumb button and projection are molded from plastic as a single piece.

6. The fishing reel according to claim 1 wherein the projection has an elongate configuration taken in cross section at right angles to the first axis.

7. The fishing reel according to claim 1 wherein the projection has a rectangular configuration taken in cross section at right angles to the first axis.

8. The fishing reel according to claim 1 wherein there is a second pin on the thumb button, said first claimed and second pin projecting oppositely to each other in cantilever fashion from the thumb button, said second pin having a curved surface to act against a second curved socket seat that is similar to the first claimed curved socket seat, and there is a projection on the second pin to take up clearance between the second pin and second curved socket seat.

9. The fishing reel according to claim 1 wherein the flexible projection comprises a flexible fin integrally formed with the pin.

10. A connection between a thumb button and housing on a fishing reel, said connection comprising:
a socket on the housing having a curved seat; and
a pin on the thumb button for reception in the socket and having a curved surface acting against the curved socket seat to guide pivoting of the pin in the socket and thereby rotation of the thumb button about a first axis,
there being a projection radially outwardly relative to the first axis from the curved pin surface to engage the curved socket seat and take up clearance between the curved pin surface and the curved socket seat,
said projection being sufficiently flexible to bend and guide smooth relative movement between the pin and curved socket seat.

11. The thumb button and housing connection according to claim 10 wherein the projection comprises a flexible fin.

12. The thumb button and housing connection according to claim 10 wherein the projection comprises a flexible fin that extends in cantilever fashion from the pin.

13. The thumb button and housing connection according to claim 12 wherein the projection is made from plastic.

14. The thumb button and housing connection according to claim 12 wherein the thumb button and projection are integrally formed.

15. The thumb button and housing connection according to claim 12 wherein the thumb button and projection are molded from plastic as a single piece.

16. The thumb button and housing connection according to claim 12 wherein the pin has a length extending generally parallel to the first axis and the fin extends over substantially the entire length of the pin.

17. The thumb button and housing connection according to claim 12 wherein the projection has an elongate configuration taken in cross section at right angles to the first axis.

18. The thumb button and housing connection according to claim 12 wherein the projection has a rectangular configuration taken in cross section at right angles to the first axis.

19. The thumb button and housing connection according to claim 12 wherein there is a second pin on the thumb button, said first claimed and second pin projecting oppositely to each other in cantilever fashion from the thumb button, said second pin having a curved surface to act against a second curved socket seat that is similar to the first claimed curved socket seat, and there is a projection on the second pin to take up clearance between the second pin and second curved socket seat.

20. A fishing reel comprising:
a housing;
a line carrying spool;
first means for selectively retrieving line onto the spool with the fishing reel in a retrieve mode and for allowing line to pay out of the spool with the fishing reel in a casting mode;
a thumb button;
second means for attaching the thumb button to the housing for pivoting movement between an undepressed state and a depressed state; and
cooperating means on the first means and the thumb button for changing the reel from its retrieve mode to its casting mode as an incident of the thumb button moving from its undepressed state to its depressed state,
said second means comprising a cooperating pin and socket one each on the housing and thumb button,
said socket comprising a curved seat,
said pin having a peripheral surface that acts against the curved socket seat to guide rotation of the thumb button about the pin and a first pivot axis,
said pin having a flexible projection radially outwardly relative to the first pivot axis from the peripheral surface with respect to the first pivot axis to engage the curved socket seat and take up clearance between the curved pin surface and the curved socket seat,
said flexible projection being elongate in cross section taken parallel to the first pivot axis to allow it to bend and thereby sweep along the curved socket seat as the thumb button is moved between its undepressed and depressed states.

* * * * *